(12) United States Patent
Ichino

(10) Patent No.: US 12,150,548 B2
(45) Date of Patent: Nov. 26, 2024

(54) OBJECT CARRIER AND LIFT

(71) Applicants: DAIFUKU CO., LTD., Osaka (JP); Taiwan Daifuku Co., Ltd., Tainan (TW)

(72) Inventor: Kiyohide Ichino, Tainan (TW)

(73) Assignees: DAIFUKU CO., LTD., Osaka (JP); Taiwan Daifuku Co., Ltd., Tainan (TW)

( * ) Notice: Subject to any disclaimer, the term of this patent is extended or adjusted under 35 U.S.C. 154(b) by 0 days.

(21) Appl. No.: 18/089,508

(22) Filed: Dec. 27, 2022

(65) Prior Publication Data

US 2023/0309690 A1 Oct. 5, 2023

(30) Foreign Application Priority Data

Mar. 31, 2022 (JP) ................................ 2022-059654

(51) Int. Cl.

| | |
|---|---|
| *A47B 57/32* | (2006.01) |
| *B62B 3/02* | (2006.01) |
| *B62B 3/06* | (2006.01) |
| *B62B 3/14* | (2006.01) |
| *A47B 51/00* | (2006.01) |

(52) U.S. Cl.
CPC ................ *A47B 57/32* (2013.01); *B62B 3/02* (2013.01); *B62B 3/0625* (2013.01); *B62B 3/1476* (2013.01); *A47B 2051/005* (2013.01); *B62B 2206/06* (2013.01)

(58) Field of Classification Search
CPC . A47B 57/32; A47B 2051/005; B62B 3/0625; B62B 3/02; B62B 3/1476; B62B 2206/06

USPC ......................................................... 211/192
See application file for complete search history.

(56) References Cited

U.S. PATENT DOCUMENTS

| | | | | |
|---|---|---|---|---|
| 3,847,489 | A * | 11/1974 | Van Riper ............. | F16B 7/0446 248/245 |
| 4,344,368 | A * | 8/1982 | Remington ............ | B65D 19/44 108/55.3 |
| 4,934,858 | A * | 6/1990 | Beaulieu ................ | F16B 12/40 403/174 |

(Continued)

FOREIGN PATENT DOCUMENTS

| | | |
|---|---|---|
| JP | 2008024417 | 2/2008 |
| KR | 102299287 | 9/2021 |

*Primary Examiner* — Stanton L Krycinski
(74) *Attorney, Agent, or Firm* — JCIPRNET

(57) ABSTRACT

The object carrier for carrying objects is provided, wherein the engaging portions of the shelf member are engaged with the engaged portions of the frame member from top to bottom in the vertical direction to constitute the engagement state between the shelf member and the frame member, the connection line between the engaged portions constitutes an engagement direction, and the shelf member moves in an engagement releasing direction perpendicular to the engagement direction on a horizontal plane to release the engagement state with the frame member. The lift for removing objects from the object carrier is provided, wherein the bearing portion moves in the vertical direction through the lifting portion and bears the shelf member on which the object is placed under the object carrier, and the bearing portion moves in the horizontal direction through the sliding portion, so as to remove the shelf member and the object altogether.

6 Claims, 6 Drawing Sheets

(56) References Cited

U.S. PATENT DOCUMENTS

| | | | | |
|---|---|---|---|---|
| 5,680,737 | A * | 10/1997 | Sheipline | F16B 7/0453 |
| | | | | 403/205 |
| 5,695,081 | A * | 12/1997 | Alkalay | F16B 12/40 |
| | | | | 211/186 |
| 6,425,563 | B1 * | 7/2002 | Mihailoff | A47F 5/10 |
| | | | | 248/245 |
| 7,191,908 | B2 * | 3/2007 | De Rijk | A47B 57/48 |
| | | | | 211/208 |
| 8,038,021 | B2 * | 10/2011 | Chen | A47B 46/005 |
| | | | | 211/187 |
| 8,672,150 | B2 * | 3/2014 | Chen | A47B 57/50 |
| | | | | 211/187 |
| 9,167,896 | B1 * | 10/2015 | Wu | A47B 96/1441 |
| 9,226,575 | B2 * | 1/2016 | Crowley | A47B 43/003 |
| 9,629,455 | B2 * | 4/2017 | Shah | A47B 47/0083 |
| 10,206,506 | B1 * | 2/2019 | Lai | A47B 96/1433 |
| 10,299,588 | B1 * | 5/2019 | Lai | A47B 95/00 |
| 10,441,074 | B2 * | 10/2019 | Dahatonde | A47B 96/1441 |
| 11,484,117 | B2 * | 11/2022 | Dunseath | F16H 19/06 |
| 2004/0200794 | A1 * | 10/2004 | De Rijk | A47B 57/48 |
| | | | | 211/182 |
| 2005/0184630 | A1 * | 8/2005 | Bonanno | A47B 57/32 |
| | | | | 312/408 |
| 2017/0238710 | A1 * | 8/2017 | Tsai | A47B 57/34 |

* cited by examiner

OBJECT CARRIER AND LIFT

CROSS REFERENCE TO RELATED APPLICATIONS

This application claims the priority benefit of Japanese Patent Application No. 2022-059654, filed on Mar. 31, 2022. The entirety of the above-mentioned patent application is hereby incorporated by reference herein and made a part of this specification.

BACKGROUND

Technical Field

The present disclosure relates to an object carrier and a lift, and in particular relates to an object carrier capable of carrying objects and a lift capable of removing objects from the object carrier.

Description of Related Art

In the related art, an object carrier is developed for carrying objects, so that the objects may be stored on the object carrier. When the object carrier is set at a high place, for example, for a suspended object carrier (or a suspended frame) set on the ceiling, the object may be transported to or removed from the suspended object carrier through automatic conveying equipment. In this way, the upper space of a building (that is, a position near the ceiling) may be effectively utilized to store objects, and automatic management (storage or removal) of objects may be performed through the object carrier and automatic conveying equipment, which makes the management of objects more efficient.

SUMMARY

However, when the automatic conveying equipment is malfunctioned (for example, power failure), it is difficult for the operator to manually remove the object from the object carrier set at a high place, and the weight of the object is often too heavy for the operator to easily carry with bear hands.

The present disclosure provides an object carrier and a lift capable of easily removing an object through an operator's operation.

The object carrier for carrying objects of the present disclosure includes: a frame member; and a shelf member, which is arranged on the frame member to carry the object. The shelf member is provided with at least a pair of engaging portions protruding toward the frame member. The frame member is provided with at least one pair of engaged portions protruding toward the shelf member and corresponding to the engaging portions, and the engaging portions are engaged with the engaged portions from top to bottom in the vertical direction to constitute the engagement state between the shelf member and the frame member. The connection line between the at least one pair of engaged portions constitutes an engagement direction, and the shelf member moves in an engagement releasing direction perpendicular to the engagement direction on a horizontal plane to release the engagement state with the frame member.

The lift for removing objects from the object carrier of the present disclosure includes: a trolley portion movable on a horizontal plane formed by a front-rear direction and a left-right direction; a lifting portion disposed on the trolley portion and movable in the vertical direction; a bearing portion disposed on the lifting portion to bear the shelf member of the object carrier on which the object is placed; and a sliding portion disposed between the bearing portion and the lifting portion, making the bearing portion movable relative to the lifting portion on the horizontal plane. The bearing portion moves in the vertical direction through the lifting portion and bears the shelf member on which the object is placed under the object carrier. The bearing portion moves in the horizontal direction through the sliding portion, so as to remove the shelf member and the object altogether.

Based on the above, in the object carrier of the present disclosure, the shelf member moves in an engagement releasing direction perpendicular to the engagement direction on a horizontal plane to release the engagement with the frame member. Correspondingly, in the lift of the present disclosure, the bearing portion moves in the horizontal direction through the sliding portion, so as to remove the shelf member and the object altogether. In this way, when the automatic conveying equipment is malfunctioned (for example, power failure), even if the object carrier is disposed at a high place, or an object is heavy, the object may be easily removed through the object carrier and lift of the present disclosure. According to the above, the object carrier and lift of the present disclosure are able to easily remove the object through the operation of the operator.

DESCRIPTION OF THE EMBODIMENTS

Figure 1:
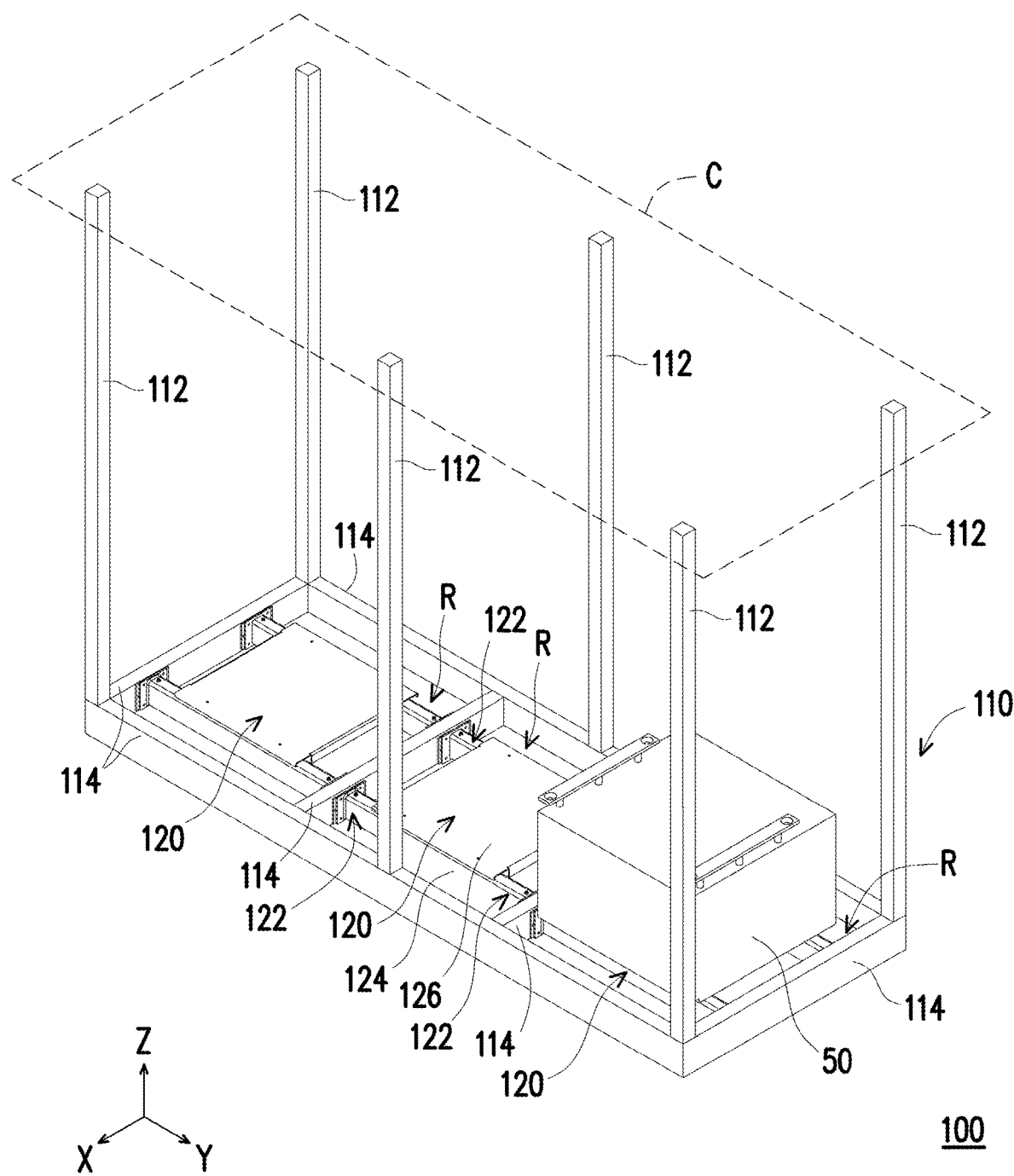
FIG. 1 is a perspective view of an object carrier according to an embodiment of the present disclosure.
Figure 2:
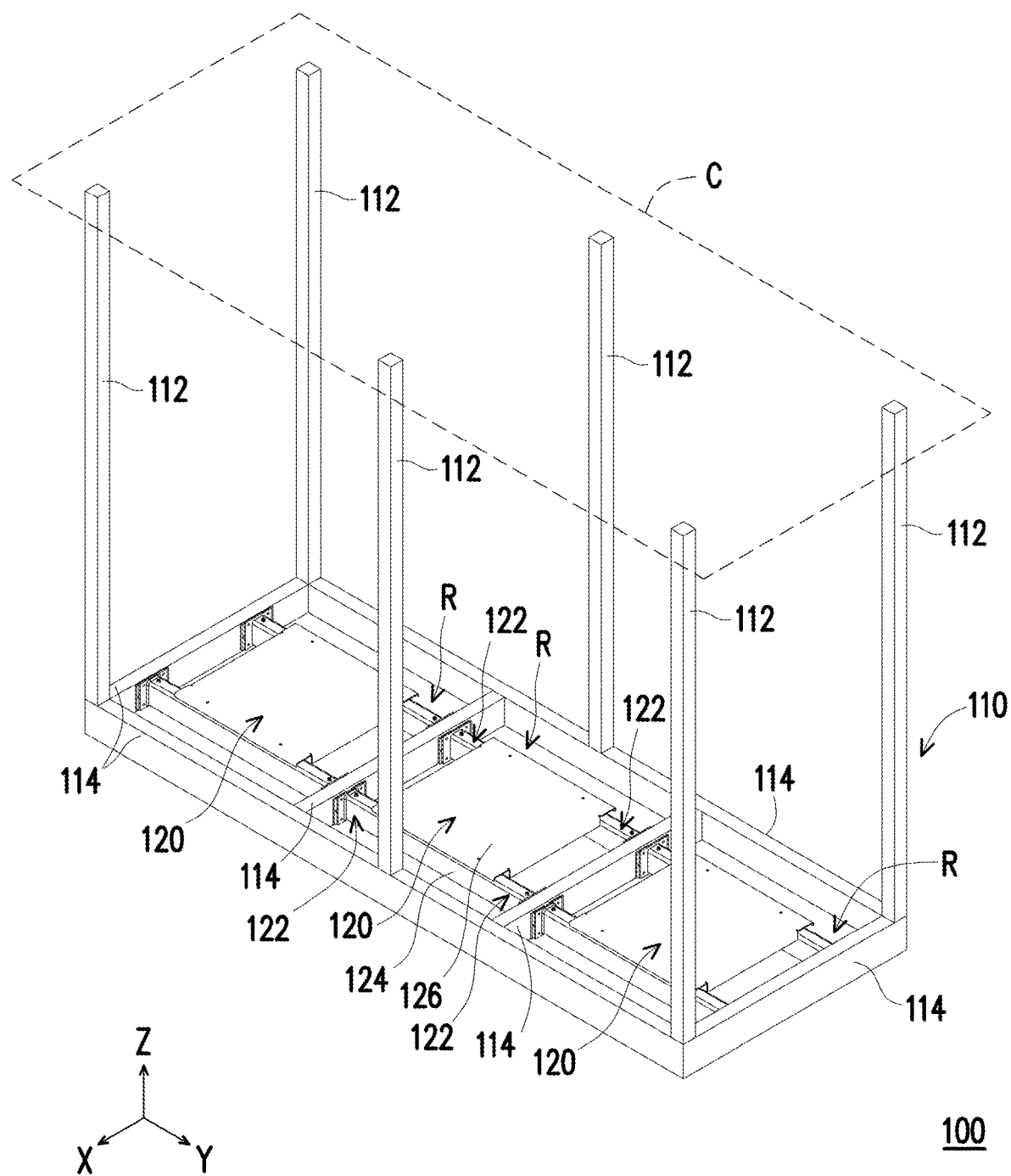
FIG. 2 is a perspective view of the object carrier shown in FIG. 1 carrying an object in one of the configuration regions.
Figure 3:
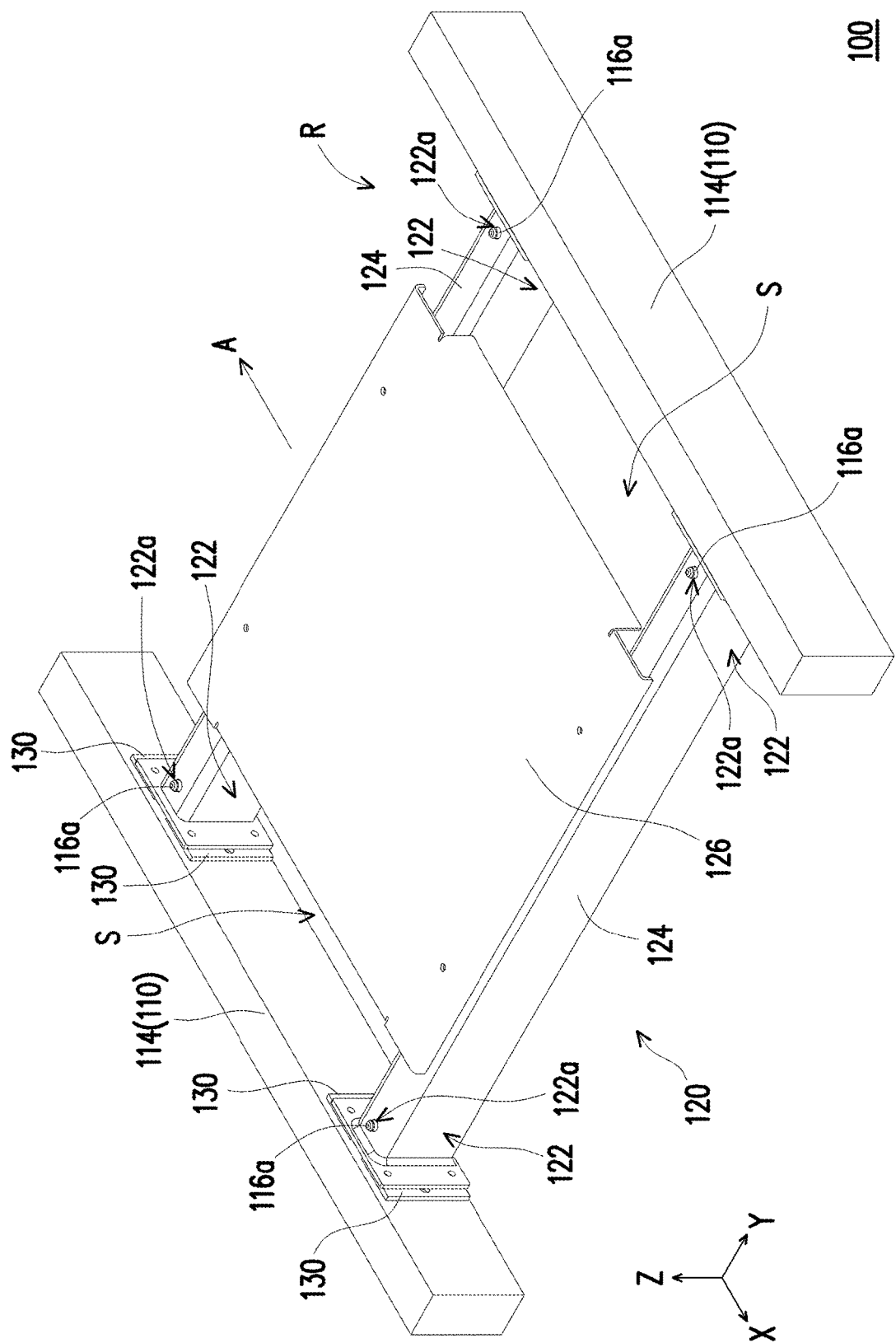
FIG. 3 is a partially enlarged view of the object carrier shown in FIG. 1 in one of the configuration regions.
Figure 4:
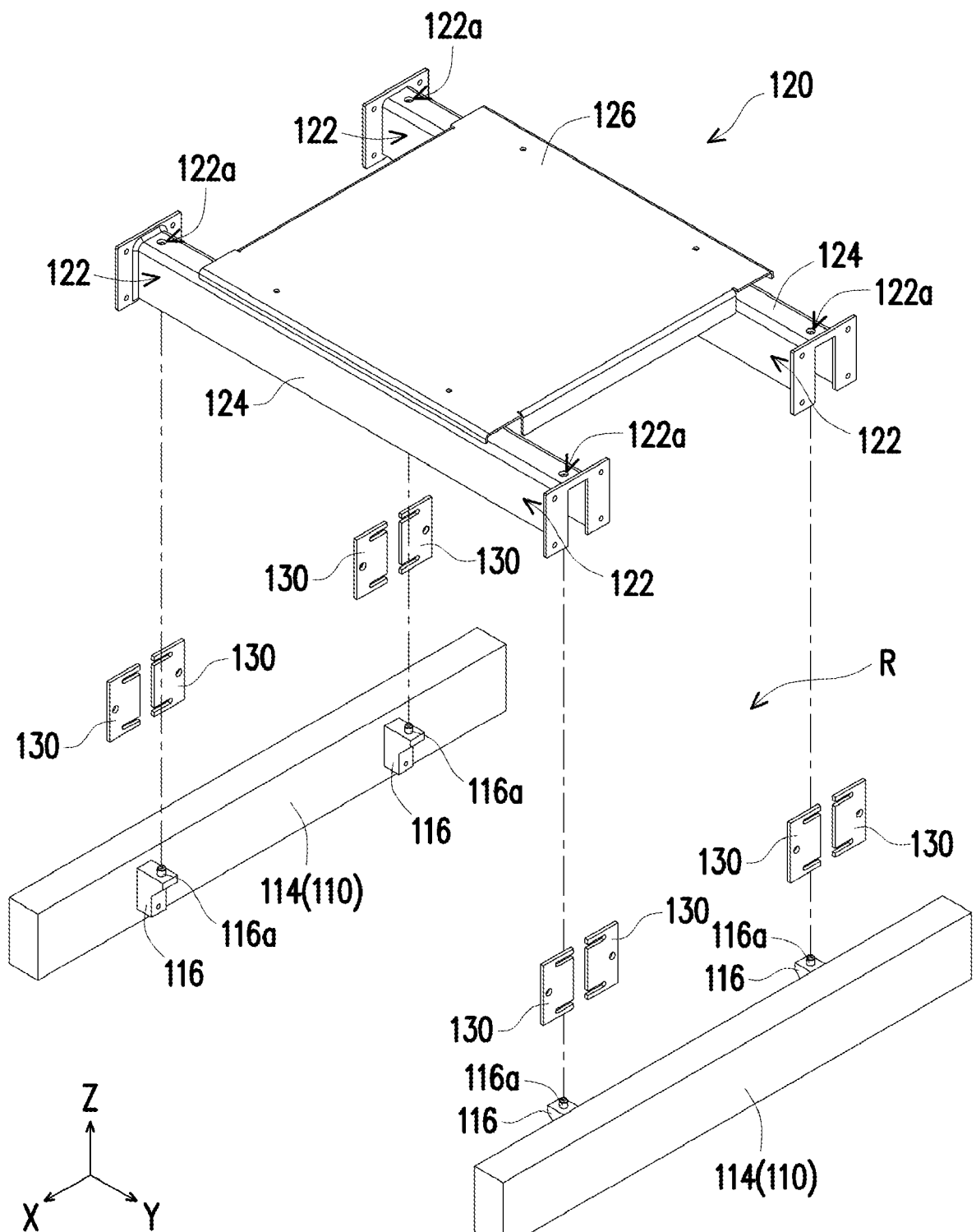
FIG. 4 is an exploded view of the object carrier shown in FIG. 3 in one of the configuration regions.
Figure 5:
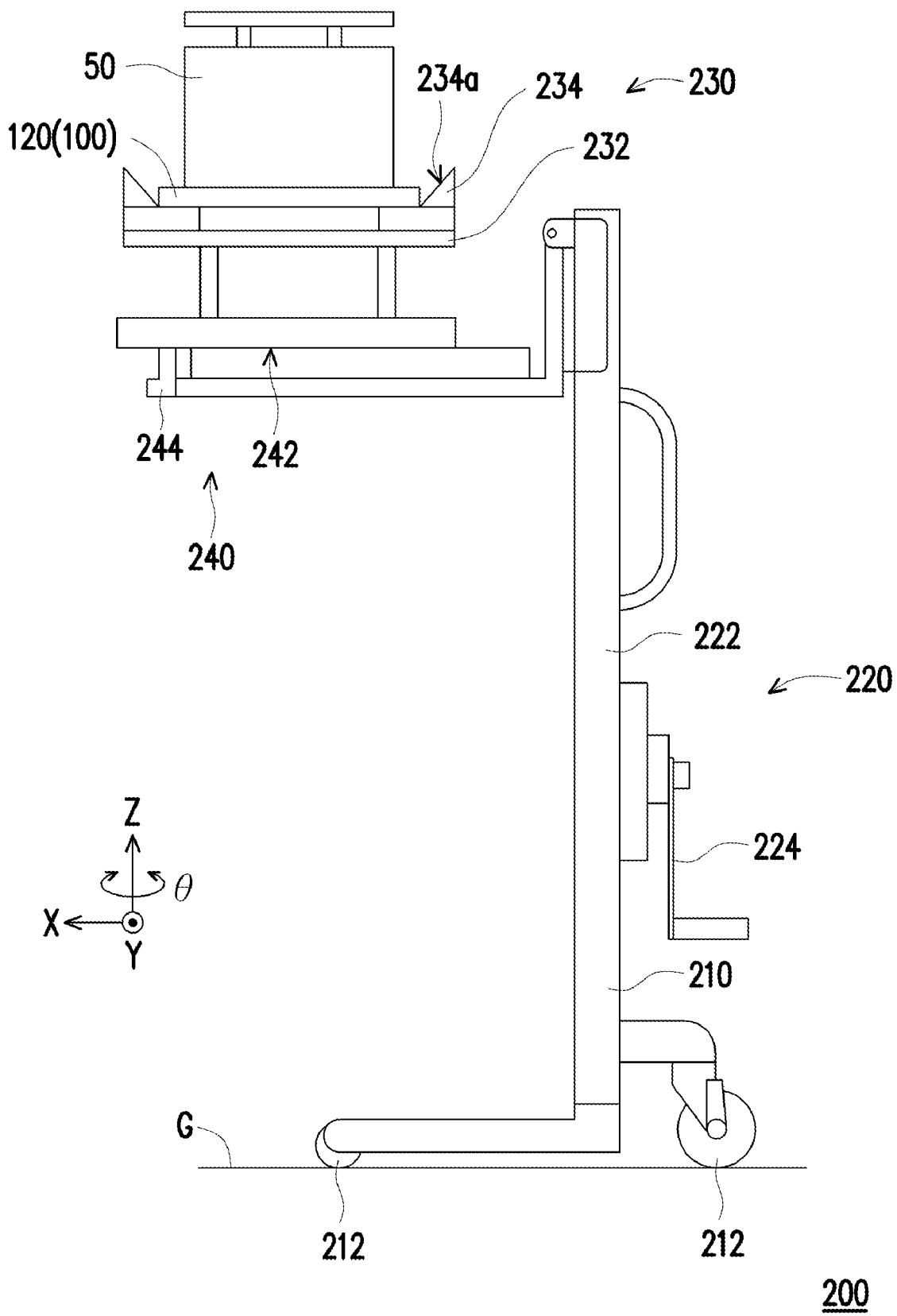
FIG. 5 is a schematic view of the operation of removing an object from the object carrier by using a lift according to an embodiment of the present disclosure.
Figure 6:
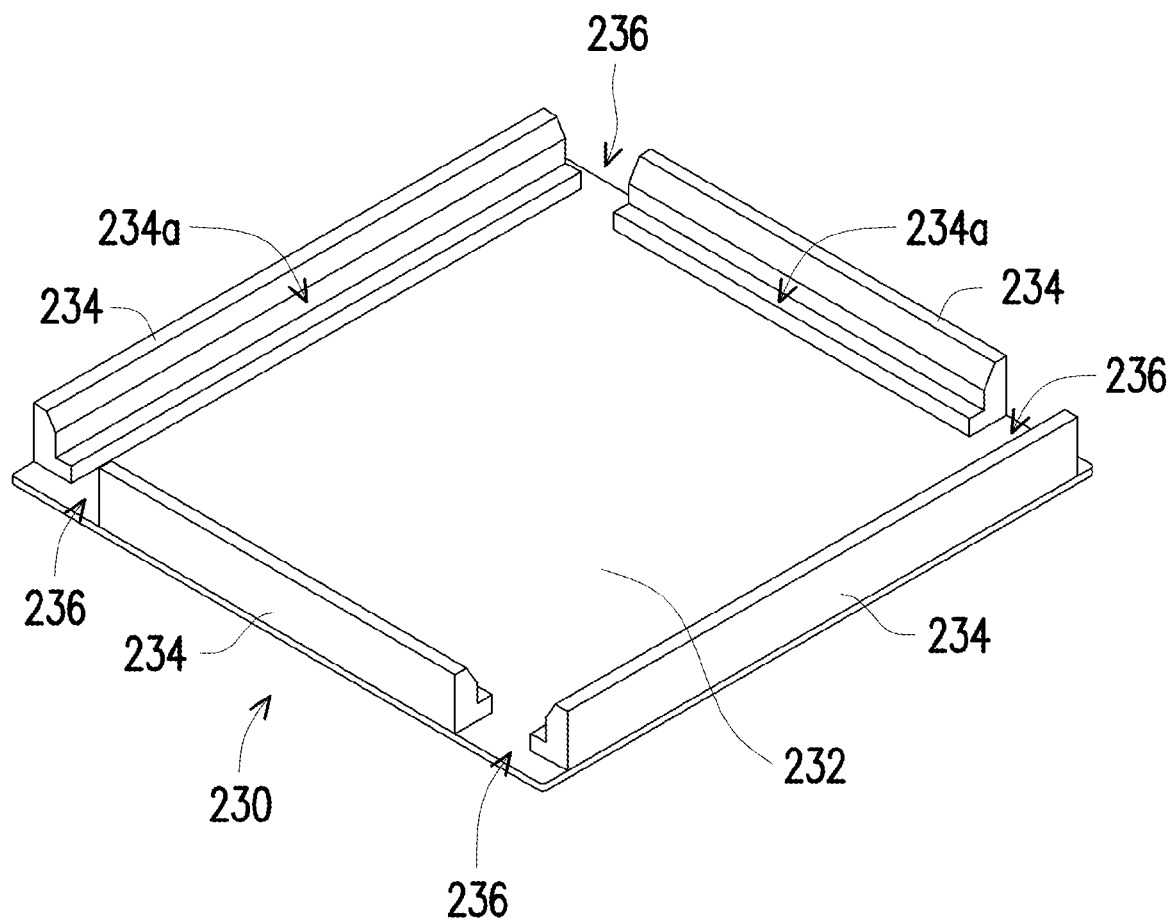
FIG. 6 is a perspective view of a bearing portion used in the lift shown in FIG. 5.

Reference will now be made in detail to the exemplary embodiments of the present disclosure, examples of which are illustrated in the accompanying drawings. FIG. 1 is a perspective view of an object carrier according to an embodiment of the present disclosure. FIG. 2 is a perspective view of the object carrier shown in FIG. 1 carrying an object in one of the configuration regions. FIG. 3 is a partially enlarged view of the object carrier shown in FIG. 1 in one of the configuration regions. FIG. 4 is an exploded view of the object carrier shown in FIG. 3 in one of the configuration regions. FIG. 5 is a schematic view of the operation of removing an object from the object carrier by using a lift according to an embodiment of the present disclosure. FIG. 6 is a perspective view of a bearing portion used in the lift shown in FIG. 5. An object carrier 100 and a lift 200 of this embodiment will be described below with reference to FIG. 1 to FIG. 6, and a spatial coordinate system XYZ is used to represent the front-rear direction X, the left-right direction Y, and the vertical direction Z for description, but this is only one of the examples of the present disclosure, and the present disclosure is not limited thereto.

Please refer to FIG. 1 and FIG. 2. In this embodiment, the object carrier 100 used to carry the object 50 may be an object carrier disposed at a high place, such as a suspended frame disposed on the ceiling C, so that the object 50 may be handled to or removed from the suspended object carrier 100 through automatic conveying equipment (not shown). In this way, the upper space of a building (that is, a position near the ceiling C) may be effectively utilized to store objects, and automatic management (storage or removal) of the object 50 may be performed through the object carrier 100 and automatic conveying equipment, which makes the management of the object 50 more efficient. However, when the automatic conveying equipment is malfunctioned (for example, power failure), it is difficult for the operator to manually remove the object 50 from the object carrier 100 set at a high place, and the weight of the object 50 is often too heavy for the operator to easily carry with bear hands. To solve the above problem, the object carrier 100 has a structural configuration as described below, and the object 50 may be easily removed by an operator's operation.

Specifically, in this embodiment, as shown in FIG. 1 and FIG. 2, the object carrier 100 includes a frame member 110 and a shelf member 120. The frame member 110 is composed of a plurality of frame bars, for example, including a plurality of vertical frame bars 112 arranged on the ceiling C and extending along the vertical direction Z (i.e., the direction of gravity), and a plurality of horizontal frame bars 114 forming a configuration region R on the horizontal plane. The shelf member 120 is disposed on the frame member 110, for example, in a configuration region R of the frame member 110 to carry the object 50. The frame member 110 of the object carrier 100 forms a plurality of configuration regions R (three are shown in the example), and a plurality of shelf members 120 (three are shown in the example) are correspondingly disposed in the plurality of configuration regions R, so as to correspondingly carry one object 50 or more. For example, an object 50 (as shown in FIG. 2) may be placed correspondingly on one shelf member 120 and other shelf members 120 are empty with no object placed thereon, or multiple objects may be placed on the same shelf member 120, or some of the shelf members 120 are correspondingly placed with objects. In addition, it may be that only one configuration region R is formed on the frame member 110 and only one shelf member 120 is disposed on the frame member 110. The present disclosure does not limit the specific structures of the frame member 110 and the shelf member 120, nor does it limit the application of the object 50, which may be adjusted according to requirements.

Furthermore, in this embodiment, one of the configuration regions R of the object carrier 100 is taken as an example for illustration. As shown in FIG. 3 and FIG. 4, the shelf member 120 is provided with at least one pair of engaging portions 112 (for example, two pairs) protruding toward the frame member 110, and the frame member 110 is provided with at least one pair of engaged portions 116 (for example, two pairs) protruding toward the shelf member 120 and corresponding to the engaging portion 122. That is to say, the shelf member 120 is disposed in the configuration region R formed by the frame member 110 and is located inside the frame member 110, so the at least one pair of engaging portions 122 of the shelf member 120 protruding toward the frame member 110 are preferably extended outward from two opposite ends (for example, two opposite ends in the left-right direction Y) of the shelf member 120, and the at least one pair of engaged portions 116 of the frame member 110 protruding toward the shelf member 120 are preferably extend inward from the frame member 110. Thus, the engaging portion 122 of the shelf member 120 is engaged with the engaged portion 116 from top to bottom in the top-down direction (i.e., the vertical direction Z) to form an engagement state between the shelf member 120 and the frame member 110, so that the shelf member 120 is limited to the horizontal plane where the configuration region R of the frame member 110 is located. In this case, a connection line between the at least one pair of engaged portions 116 constitutes an engagement direction (parallel to the left-right direction Y in the example, but not limited thereto).

Furthermore, in this embodiment, as shown in FIG. 3, the shelf member 120 includes a pair of shelf bodies 124 extending along the engagement direction (parallel to the left-right direction Y in the example) and a pair of plate bodies 126 (which are parallel to the horizontal plane formed by the front-rear direction X and the left-right direction Y in the example, but not limited thereto) disposed over the pair of shelf bodies 124. The length of the shelf body 124 in the engagement direction (parallel to the left-right direction Y in the example) is greater than the length of the plate body 126 in the engagement direction, so as to form the engaging portion 122 protruding toward the frame member 110 on the two opposite ends of the shelf body 124. Moreover, as shown in FIG. 4, the engaged portion 116 is formed as a bump protruding from the inner surface of the frame member 110 toward the shelf member 120 along the engagement direction (parallel to the left-right direction Y in the example). Therefore, when the shelf member 120 is placed on the frame member 110 from top to bottom in the top-down direction (i.e., the vertical direction Z), the engaging portion 122 of the shelf member 120 is engaged with the engaged portion 116 from top to bottom in the top-down direction (i.e., the vertical direction Z) to form an engagement state between the shelf member 120 and the frame member 110. Thus, the lower part of the shelf member 120 is supported by the frame member 110, so that the upper part of the shelf member 120 is able to carry the object 50, and the weight of the object 50 is distributed from the shelf member 120 to the frame member 110. The object 50 may be transported to or removed from the suspended object carrier 100 through automatic conveying equipment (not shown), and the object 50 is placed on the shelf member 120 from top to bottom in the top-down direction (i.e., the vertical direction Z).

Furthermore, in this embodiment, the direction perpendicular to the engagement direction (parallel to the left-right direction Y in the example) on the horizontal plane is defined as the engagement releasing direction (parallel to the front-rear direction X in the example, but not limited thereto). When the engaging portion 122 of the shelf member 120 is engaged with the engaged portion 116 from top to bottom in the top-down direction (i.e., the vertical direction Z) to form an engagement state between the shelf member 120 and the frame member 110, the shelf member 120 is movable in the engagement releasing direction (parallel to the front-rear direction X in the example) perpendicular to the engagement direction (parallel to the left-right direction Y in the example) on a horizontal plane (shown by arrow A in FIG. 3) to release the engagement state with the frame member 110. That is, the shelf member 120 and the frame member 110 may be engaged or disengaged according to requirements.

In detail, in this embodiment, as shown in FIG. 4, at least a part of the engaging portion 122 is formed as an inverted U-shape, so that the engaging portion 122 is engaged with the engaged portion 116 (such as a bump) from top to bottom in the top-down direction (i.e., the vertical direction Z), for example, the inverted U-shaped portion of the engaging portion 122 covers the engaged portion 116. In addition, the upper surface of the engaged portion 116 in the top-down direction (i.e., the vertical direction Z) is provided with a protrusion 116a, and the upper surface of the engaging portion 122 in the top-down direction (i.e., the vertical direction Z) is provided with an opening 122a. The protrusion 116a of the engaged portion 116 passes through the opening 122a of the engaging portion 122, so that the engaging portion 122 engages with the engaged portion 116 (for example, a bump) from top to bottom in the top-down direction (i.e., the vertical direction Z). In this way, the shelf member 120 and the frame member 110 engage with each other not only in the engagement direction (parallel to the left-right direction Y in the example), but also engage with each other in a direction (parallel to the front-rear direction X in the example) perpendicular to the engagement direction on the horizontal plane. As such, the fixing effect for the shelf member 120 and the frame member 110 is improved, so as to facilitate bearing of the object 50 more stably.

Thus, when the object 50 cannot be removed from the top of the object carrier 100 by using the automatic conveying equipment, for example, when the automatic conveying equipment is malfunctioned (such as power failure), as one of the ways to remove the object 50, it is preferable to make the shelf member 120 move from the bottom to the top in the top-down direction (that is, the vertical direction Z) and in the engagement releasing direction to release the engagement state with the frame member 110, thereby removing the shelf member 120 and the object 50 placed on the shelf member 120 altogether. That is to say, the operator uses a tool (such as the lift described later, but not limited thereto) to support the shelf member 120 from below the shelf member 120, and move the shelf member 120 upward from the bottom of the top-down direction (i.e., the vertical direction Z) of the shelf member 120, thereby releasing the engagement relationship between the inverted U-shaped portion of the engaging portion 122 and the engaged portion 116 (such as a bump) first, and then releasing the engagement relationship between the opening 122a of the engaging portion 122 and the protrusion 116a of the engaged portion 116. Thereafter, the shelf member 120 is moved in the engagement releasing direction (parallel to the front-rear direction X in the example) (shown by the arrow A in FIG. 3), thereby releasing the engagement state between the shelf member 120 and the frame member 110, and removing the shelf member 120 and the object 50 placed on the shelf member 120 altogether. Under the circumstances, since the at least one pair of engaged portions 116 are respectively arranged on the inner surface of the frame member 110 without being connected to each other (as shown in FIG. 4), the at least one pair of engaged portions 116 will not interfere with the movement of the tool in the engagement releasing direction (parallel to the front-rear direction X in the example). In this way, the above arrangement of the object carrier 100 (especially the arrangement of the shelf member 120 that is movable in the engagement releasing direction) may facilitate the operator to easily remove the object 50 even if the object carrier 100 is disposed at a high place or the object 50 is heavy.

However, the above-mentioned method of removing the object 50 is only one of the exemplary descriptions made corresponding to the structure of the object carrier 100. In other embodiments that are not shown, the engagement method of the engaging portion 122 and the engaged portion 116 may only use the inverted U-shaped portion without setting a combination of the opening 122a and the protrusion 116a, or only use the combination of the opening 122a and the protrusion 116a without setting the inverted U-shaped portion. Or, a U-shaped part may also be provided on the bump used as the engaged portion 116, and the engaging portion 122 is placed in the U-shaped portion of the bump used as the engaged portion 116 to engage with the engaged portion 116. As one of the ways to remove the object 50 in the above structure, reference may be made to the description provided above, that is, the shelf member 120 moves from the bottom to the top in the top-down direction (that is, the vertical direction Z) and in the engagement releasing direction (parallel to front-rear direction X in the example), but the present disclosure is not limited thereto.

Furthermore, in other embodiments that are not shown, the engaging portion 122 and the engaged portion 116 may not be provided with an inverted U-shaped portion and a combination of the opening 122a and the protrusion 116a. As an alternative, although it is not a preferred approach, the engaging portion 122 of the shelf member 120 may also be placed on the upper surface of the engaged portion 116 from top to bottom in the top-down direction (that is, the vertical direction Z), and the two are engaged through frictional force to form the engagement state between the shelf member 120 and the frame member 110. Under the circumstances, as one of the ways to remove the object 50 in the above structure, it is preferable that the shelf member 120 moves in the engagement releasing direction (parallel to the front-rear direction X in the example) to release the engagement state with the frame member 110. That is, when the shelf member 120 and the frame member 110 engage only in the engagement direction (parallel to the left-right direction Y in the example) but not engage in the direction (parallel to the front-rear direction X in the example) perpendicular to the engagement direction on the horizontal plane, as long as the shelf member 120 moves in the engagement releasing direction, it is not limited whether the shelf member 120 moves from the bottom to the top in the top-down direction (that is, the vertical direction Z), which may be adjusted according to requirement. In this way, even if the object carrier 100 has a different structure, the object 50 may be easily removed as long as the shelf member 120 of the object carrier 100 is movable in the engagement releasing direction.

In addition, in this embodiment, as shown in FIG. 3 and FIG. 4, a spacer 130 may be provided between the engaging portion 122 and the frame member 110, and there may be a gap between the engaging portion 122 and the frame member 110 due to tolerance or design requirements. The movement of the shelf member 120 relative to the frame member 110 in the engagement direction is restricted through the spacer 130. That is, after the engaging portion 122 of the shelf member 120 is engaged with the engaged portion 116 from top to bottom in the top-down direction (i.e., vertical direction Z), the spacer 130 may be inserted between the engaging portion 122 and frame member 110 as required (as shown in FIG. 3). Also, in the case where the spacer 130 is provided, the spacer 130 may be removed from between the engaging portion 122 and the frame member 110 by moving in the engagement releasing direction (parallel to front-rear direction X in the example) (as shown in FIG. 4) to facilitate the movement of the shelf member 120 in the engagement releasing direction (parallel to front-rear direction X in the example). However, the present disclosure does not limit the setting of the spacers 130, which may be adjusted according to requirements.

Next, please refer to FIG. 5 and FIG. 6, in this embodiment, the lift 200 for removing the object 50 from the object carrier 100 includes a trolley portion 210, a lifting portion 220, a bearing portion 230, and a sliding portion 240. The object carrier 100 is, for example, a suspended object carrier as mentioned above, but it is not limited thereto. Furthermore, in the lift 200, the trolley portion 210 is movable on the horizontal plane (for example, the ground G) which consists of the front-rear direction X and the left-right direction Y. The lifting portion 220 is provided on the trolley portion 210 and is movable in the vertical direction Z. The bearing portion 230 is disposed on the lifting portion 220 to bear the shelf member 120 of the object carrier 100 on which the object 50 is placed. The sliding portion 240 is disposed between the bearing portion 230 and the lifting portion 220, so that the bearing portion 230 is movable relative to the lifting portion 220 on a horizontal plane (e.g., the plane where the bearing portion 230 is located). The movement includes, but not limited to, movement along the front-rear direction X, movement along the left-right direction Y, or rotation in the rotation direction θ on the horizontal plane. Thus, the lift 200 has the function of moving the bearing portion 230 in four axial directions, namely, the front-rear direction X, the left-right direction Y, the vertical direction Z, and the rotation direction θ. The bearing portion 230 moves in the vertical direction Z through the lifting portion 220 (with the function of moving on the vertical direction Z), and bears the shelf member 120 on which the object 50 is placed under the object carrier 100, and the bearing portion 230 moves in the horizontal direction (such as the aforementioned engagement releasing direction, parallel to front-rear direction X in the example) through the sliding portion 240 (with the function of moving in the front-rear direction X, the left-right direction Y, and the rotation direction θ), so as to remove the shelf member 120 and the object 50 placed on the shelf member 120 altogether.

Specifically, in this embodiment, as shown in FIG. 5, a plurality of wheels 212 are provided below the trolley portion 210, so that the trolley portion 210 is movable on a horizontal plane (for example, the ground G) formed by the front-rear direction X and the left-right direction Y, but the present disclosure does not limit the specific structure and moving mode of the trolley portion 210. The lifting portion 220 includes a lifting mechanism 222 movable in the vertical direction Z, and a lifting handle 224 that drives the lifting mechanism 222 to move in the vertical direction Z through rotation, so that the operator may operate the lifting mechanism 222 through the lifting handle 224, thereby controlling the movement of the lifting portion 220 in the vertical direction Z. Similarly, the sliding portion 240 includes a sliding mechanism 242 movable on a horizontal plane (for example, the plane where the bearing portion 230 is located), and a sliding handle 244 that drives the sliding mechanism 242 to move on the horizontal plane through rotation, so that the operator may operate the sliding mechanism 242 through the sliding handle 244, thereby controlling the movement of the sliding portion 240 on the horizontal plane. Although the purpose of setting the sliding portion 240 is to drive the bearing portion 230 to move in the horizontal direction (such as the aforementioned engagement releasing direction, parallel to front-rear direction X in the example) to remove the shelf member 120 and the object 50 placed on the shelf member 120 altogether, since the sliding portion 240 has the function of moving in the front-rear direction X, the left-right direction Y and the rotation direction θ, the position of the bearing portion 230 may also be finely adjusted through the movement of the sliding portion 240 in the left-right direction Y and the rotation direction θ. However, in other embodiments that are not shown, other mechanisms may also be used as the lifting portion 220 and the sliding portion 240, and an automatic mechanism may also be used to automatically control the movement of the lifting portion 220 and the sliding portion 240, the present disclosure provides no limitation thereto.

Moreover, in this embodiment, as shown in FIG. 5 and FIG. 6, the bearing portion 230 is provided with a bearing surface 232 which bears the shelf member 120 of the object carrier 100 on which the object 50 is placed, a raised portion 234 disposed around the bearing surface 232, and a notch portion 236 disposed around the bearing surface 232 and adjacent to the raised portion 234. The raised portion 234 is provided with an inclined surface 234a inclined inwardly from top to bottom. When the bearing portion 230 bears the shelf member 120 on which the object 50 is placed under the object carrier 100, the raised portion 234 may pass through a gap S between the shelf member 120 and the frame member 110 of the object carrier 100 (please refer to FIG. 3), and guides the position of the shelf member 120 on the bearing surface 232 through the inclined surface 234a. Furthermore, when the bearing portion 230 bears the shelf member 120 on which the object 50 is placed under the object carrier 100, the engaging portions 122 provided at two opposite ends of the shelf member 120 protrude out of the bearing surface 232 through the notch portion 236 without interfering the raised portion 234. That is to say, the raised portion 234 arranged around the bearing surface 232 is not around the entire outer circumference of the bearing surface 232, but is provided as a plurality of raised portions 234 separately, so that the notch portion 236 is formed between two adjacent raised portions 234. However, the present disclosure does not limit the specific structure and disposition of the raised portion 234 and the notch portion 236, which may be adjusted according to requirements.

Thus, when the object 50 cannot be removed from the top of the object carrier 100 by using the automatic conveying equipment, for example, when the automatic conveying equipment is malfunctioned (such as a power failure), in the case where the engaging portion 122 and the engaged portion 116 of the object carrier 100 are engaged by using the inverted U-shaped portion and/or the combination of the opening 122a and the protrusion 116a as described above, as one of the ways to remove the object 50, it is preferable that the operator uses the lift 200 to drive the shelf member 120 to move upward from the bottom of the top-down direction (i.e., vertical direction Z) and in the engagement releasing direction (parallel to front-rear direction X in the example), so as to release the engagement state with the frame member 110, thereby removing the shelf member 120 and the object 50 placed on the shelf member 120 altogether. That is to say, the operator uses the lift 200 to support the shelf member 120 from below the shelf member 120, and moves the shelf member 120 upward from the bottom of the top-down direction (i.e., vertical direction Z). The engagement relationship between the inverted U-shaped portion of the engaging portion 122 and the engaged portion 116 (such as a bump) is released first, and the engagement relationship between the opening 122a of the engaging portion 122 and the protrusion 116a of the engaged portion 116 is released thereafter. Then, the shelf member 120 is driven to move in the engagement releasing direction (parallel to front-rear direction X in the example) (as shown by the arrow A in FIG.

3), thereby releasing the engagement state between the shelf member 120 and the frame member 110, so as to remove the shelf member 120 and the object 50 placed on the shelf member 120 altogether.

Furthermore, in this process, the lift 200 uses the trolley portion 210 to move to the bottom of the object carrier 100, and uses the lifting portion 220 to move the bearing portion 230 to the bottom of the shelf member 120, so that the bearing portion 230 supports the shelf member 120 from below the shelf member 120, and moves the shelf member 120 upward from the bottom of the top-down direction (i.e., vertical direction Z). The engagement relationship between the inverted U-shaped portion of the engaging portion 122 and the engaged portion 116 (such as a bump) is released first, and the engagement relationship between the opening 122a of the engaging portion 122 and the protrusion 116a of the engaged portion 116 is released thereafter. Subsequently, the bearing portion 230 is moved in the horizontal direction by using the sliding portion 240. Under the circumstances, the lift 200 is set in such a manner that the horizontal direction is equivalent to the engagement releasing direction of the object carrier 100, so the movement of the bearing portion 230 in the horizontal direction makes the shelf member 120 move in the engagement releasing direction (parallel to front-rear direction X in the example) (as shown by the arrow A in FIG. 3), thereby releasing the engagement state between the shelf member 120 and the frame member 110, and removing the shelf member 120 and the object 50 placed on the shelf member 120 altogether. In this way, even if the object carrier 100 is disposed at a high place, or the object 50 is heavy, the above arrangement of the object carrier 100 (especially the arrangement of the shelf member 120 that is movable in the engagement releasing direction) and the above arrangement of the lift 200 (especially the arrangement of the sliding portion 240 that can move the bearing portion 230 in the horizontal direction) facilitate the operator to easily remove the object 50.

However, the above-mentioned manner in which the lift 200 removes the object 50 is only one of exemplary descriptions made corresponding to the structure of the object carrier 100. In other embodiments that are not shown, the engaging portion 122 and the engaged portion 116 may not be provided with an inverted U-shaped portion and a combination of the opening 122a and the protrusion 116a, and the engaging portion 122 may only be placed on the upper surface of the engaged portion 116, and the two are engaged through frictional force to form the engagement state between the shelf member 120 and the frame member 110. Under the circumstances, as one of the ways to remove the object 50 by the lift 200 in the above structure, it is preferable that the lift 200 supports the shelf member 120 from below the shelf member 120, and makes the shelf member 120 move in the engagement releasing direction (parallel to the front-rear direction X in the example) to release the engagement state with the frame member 110. That is, when the shelf member 120 and the frame member 110 engage only in the engagement direction (parallel to the left-right direction Y in the example) but not engage in the direction (parallel to the front-rear direction X in the example) perpendicular to the engagement direction on the horizontal plane, as long as the shelf member 120 moves in the engagement releasing direction, it is not limited whether the shelf member 120 moves from the bottom to the top in the top-down direction (that is, the vertical direction Z), which may be adjusted according to requirement. In this way, even if the object carrier 100 has a different structure, the object may be easily removed by the lift 200 having the configuration as described above as long as the shelf member 120 of the object carrier 100 is movable in the engagement releasing direction.

As described above, in the object carrier of the present disclosure, the shelf member moves in an engagement releasing direction perpendicular to the engagement direction on a horizontal plane to release the engagement state with the frame member. Correspondingly, in the lift of the present disclosure, the bearing portion moves in the horizontal direction through the sliding portion, so as to remove the shelf member and the object altogether. In this way, when the automatic conveying equipment is malfunctioned (for example, power failure), even if the object carrier is disposed at a high place, or the object is heavy, the object may be easily removed through the object carrier and lift of the present disclosure. Furthermore, even if the object carriers has different structures, as long as the shelf member of the object carrier is movable in the engagement releasing direction, the object may be easily removed by using the lift having the above arrangement. According to the above, the object carrier and lift of the present disclosure are able to easily remove the object through the operation of the operator.

Finally, it should be noted that: the above embodiments are only used to illustrate the technical solutions of the present disclosure, rather than to limit them; although the present disclosure has been described in detail with reference to the foregoing embodiments, those of ordinary skill in the art should understand that: modifications may still be made to the technical solutions described in the foregoing embodiments, or equivalent replacements may be made to some or all of the technical features; these modifications or replacements do not make the essence of the corresponding technical solutions depart from the scope of the technical solutions of the embodiments of the present disclosure.

What is claimed is:

1. An object carrier, configured to carry an object, and comprising:
   a frame member; and
   a shelf member, which is disposed on the frame member to carry the object,
   wherein the shelf member is provided with at least a pair of engaging portions protruding toward the frame member,
   the frame member is provided with at least a pair of engaged portions protruding toward the shelf member and corresponding to the engaging portions,
   the engaging portions are engaged with the engaged portions from top to bottom in a vertical direction to constitute an engagement state between the shelf member and the frame member, a connection line between the at least one pair of engaged portions constitutes an engagement direction,
   the shelf member moves in an engagement releasing direction perpendicular to the engagement direction on a horizontal plane to release the engagement state with the frame member, so as to remove the shelf member and the object altogether,
   the shelf member comprises a pair of shelf bodies extending along the engagement direction and a plate body disposed above the pair of shelf bodies, and
   a length of each of the shelf bodies in the engagement direction is greater than a length of the plate body in the engagement direction, so as to form the engaging portion protruding toward the frame member on two opposite ends of each of the shelf bodies.

2. The object carrier according to claim 1, wherein at least a part of the engaging portion is formed as an inverted U-shape, so that the engaging portion is engaged with the engaged portion from top to bottom in the vertical direction.

3. The object carrier according to claim 1, wherein an upper surface of the engaged portion in the vertical direction is provided with a protrusion,
- an upper surface of the engaging portion in the vertical direction is provided with an opening,
- the protrusion of the engaged portion passes through the opening of the engaging portion, so that the engaging portion engages with the engaged portion from top to bottom in the vertical direction.

4. The object carrier according to claim 2, wherein the shelf member moves from the bottom to the top in the vertical direction and in the engagement releasing direction to release the engagement state with the frame member.

5. The object carrier according to claim 1, wherein a spacer is provided between the engaging portion and the frame member to limit a movement of the shelf member relative to the frame member in the engagement direction, and
- the spacer is removable from between the engaging portion and the frame member by moving in the engagement releasing direction.

6. The object carrier according to claim 1, wherein the object carrier is a suspended frame set on a ceiling,
- the frame member comprises a plurality of vertical frame bars disposed on the ceiling and extending along the vertical direction, and a plurality of horizontal frame bars forming a configuration region on the horizontal plane,
- the shelf member is disposed in the configuration region of the frame member.

* * * * *